United States Patent

Malandro et al.

[15] 3,676,849

[45] July 11, 1972

[54] MULTI DIGIT VERIFICATION APPARATUS AND METHOD

[72] Inventors: George H. Malandro, 306 Dana St., Fremont, Calif. 94538; Peter White, 2811 Woolsey St., Berkeley, Calif. 94705; Henry J. Javora, 1499 Crosley Lane, San Jose, Calif. 95132

[22] Filed: June 5, 1970

[21] Appl. No.: 43,674

[52] U.S. Cl. ....................................... 340/149 R, 340/146.2
[51] Int. Cl. .................. G08b 29/00, G08c 9/00, G06f 11/10
[58] Field of Search ................. 340/149, 164, 168, 147 MD, 340/146.1, 146.2

[56] References Cited

UNITED STATES PATENTS

| | | | |
|---|---|---|---|
| 2,973,507 | 2/1961 | Grondin | 340/164 |
| 3,233,221 | 1/1966 | Perlin et al. | 340/164 X |
| 3,493,929 | 2/1970 | Webb | 340/146.2 |
| 3,548,375 | 12/1970 | Maure | 340/146.2 X |
| 3,578,051 | 6/1971 | Hovey | 340/164 |

*Primary Examiner*—Donald J. Yusko
*Attorney*—Jack M. Wiseman

[57] ABSTRACT

Apparatus for verifying an intended user of an identification code. An operator enters the characters of the identification code into the apparatus by a suitable device, such as a keyboard, and the entered identification code is compared for verification by a predetermined relationship among the characters of the identification code. The predetermined relationship is checked by the apparatus of the present invention to control the operation of a signalling device or a control mechanism.

Each identification code comprises a plurality of sets of characters. Each set of characters includes a code selecting character and a code comparing character. There is a comparator circuit for each code selecting character position in the entered identification code. Each comparator circuit serves to compare for verification the code comparing character of its associated set of characters with the preselected code within the apparatus selected by the code selecting character of the associated set of characters. Should all the comparator circuits produce match output signals, then the apparatus verifies the user as an intended user. Should one or more comparator circuits fail to produce a match output signal, then the apparatus does not verify the user as an intended user.

17 Claims, 5 Drawing Figures

INVENTORS
GEORGE H. MALANDRO
PETER WHITE
HENRY J. JAVORA

Jack M. Wiseman

ATTORNEY

INVENTORS
GEORGE H. MALANDRO
PETER WHITE
HENRY J. JAVORA

ATTORNEY

MULTI DIGIT VERIFICATION APPARATUS AND METHOD

BACKGROUND OF THE INVENTION

The present invention relates in general to identification systems, and more particularly to a verification system in which a comparison is made between an identification code entered by an operator and a code within a verification apparatus selected by the identification code.

Heretofore, an identification of an authorized user of an identification card was made by visible inspection of the indicia on the card. Also, an identification of a holder of an identification card was made by electronic equipment scanning the identification card for predetermined indicia. In such systems, an unauthorized person could misuse an identification card without immediate detection.

A verification system for verifying the intended user of an identification card had heretofore employed the arrangement in which an operator entered an identification number manually into an apparatus and the operator also placed the identification card in the apparatus for detecting the code indicia thereon. The apparatus compared the identification number manually entered with the indicia detected on the identification card for verification of the holder of the identification card. Such a system was not only costly, but also had lent itself to deciphering of the indicia on the identification card by unauthorized users.

Identification systems have been disclosed in the following U. S. patents:

| | |
|---|---|
| Enikeieff et al. | No. 3,221,304 |
| Shafer | No. 2,315,741 |
| Brown et al. | No. 3,184,714 |
| Goldman et al. | No. 3,212,062 |
| Whitehead | No. 2,714,201 |

The inventors of the present invention have filed a pending application, Ser. No. 4,138, on Jan. 19, 1970, for Identification System.

SUMMARY OF THE INVENTION

Verification apparatus and method in which an operator enters the characters of an identification code in a verification apparatus, and the code is compared with a character selected by the digit location of a code selecting character of the entered identification code.

By virtue of the above arrangement, the verification of an intended user of an identification code can be achieved by means of apparatus without the employment of a coded article that has indicia therein detectable by the apparatus. The verification in this manner can still be made by a comparison test with preselected comparison codes, while obviating the need of memory devices or the like for the storage of account numbers or the identification codes in their entireties.

DESCRIPTION OF THE PREFERRED EMBODIMENT

Figure 1:
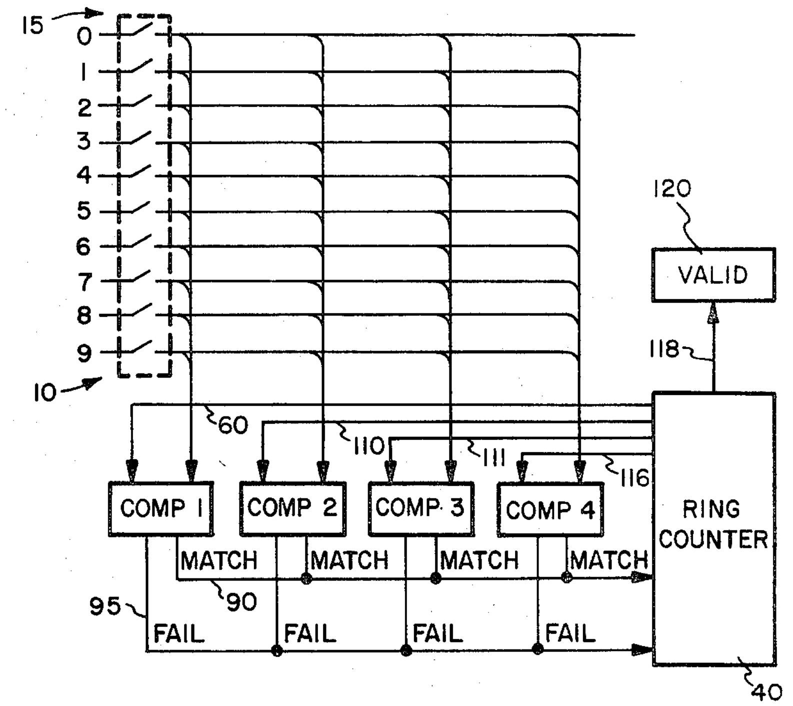
FIG. 1 is a diagrammatic illustration of the verification apparatus of the present invention.

Illustrated in FIG. 1 is the apparatus 10 of the present invention for verifying an intended user of an identification code. An operator enters the characters of the identification code into the apparatus 10 by means of a suitable device, such as a conventional keyboard 15.

Figure 2:
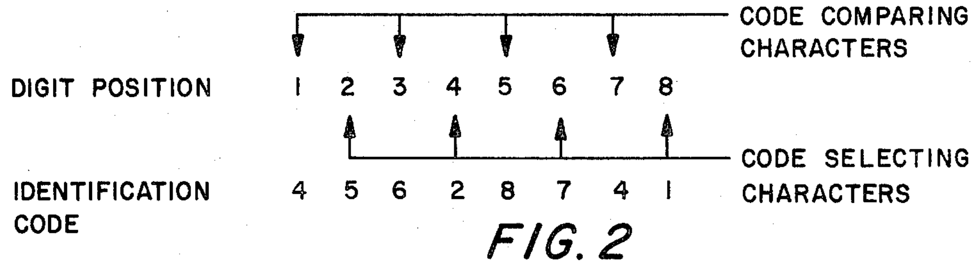
FIG. 2 is a graphic illustration of an identification code comprising code selecting characters and code comparing characters.

In the exemplary embodiment, the identification code is an account number comprising a plurality of digits. As shown in FIG. 2 an example of an account number is shown therein as identification code 45628741. Each account number comprises a plurality of sets of code selecting characters and code comparing characters. More specifically, the exemplary embodiment shows code selecting characters in the form of code selecting digits of the account number and code comparing characters in the form of code comparing digits of the account number. The code selecting and code comparing digits appear in a prescribed digit position or location for the account number 45628741. As shown in FIG. 2, the code comparing digits appear in positions 1, 3, 5 and 7 of the account number. Thus, for the example shown in FIG. 2, the code comparing digits for the account number 45628741 and 4, 6, 8 and 4, which appear in digit positions l, 3, 5 and 7, respectively. The code selecting digits appear in positions 2, 4, 6 and 8 of the account number. Hence, for the example shown in FIG. 2, the code selecting digits for the account number 45628741 are 5,2, 7 and 1 which appear in digit positions 2, 4, 6 and 8, respectively.

By way of example, each code selecting digit forms a set with one or more code comparing digits of the account number. The code comparing digit 4 is associated with or forms a set with the code selecting digit 5. The code comparing digit 6 is associated with or forms a set with the code selecting digit 2. Likewise, the code comparing digit 8 is associated with or forms a set with the code selecting digit 7. Lastly, the code comparing digit 4 is associated with or forms a set with the code selecting digit 1.

With one or more code selecting digits of an account number, there is at least one code comparing digit in the account number associated therewith or correlated therewith which digits are manually entered into the apparatus 10 by the operator when the operator selectively activates the keyboard 15 for registering into the apparatus 10 the account number. In so doing, the keyed code selecting digit operation selects a digit within the apparatus 10 to be compared with the keyed code comparing digit associated therewith for verification.

For purposes of convenience, the code selecting digit has a clearly defined sequence for locations and the associated code comparing digit is adjacent thereto. In practice, the code selecting digit while being in a prescribed location would not necessarily have an obvious sequence of positioning and the code comparing digit associated therewith would not be so obviously positioned in association therewith. In practice, the respective locations for the code selecting digits and the code comparing digit would be completely at random.

Figure 3:
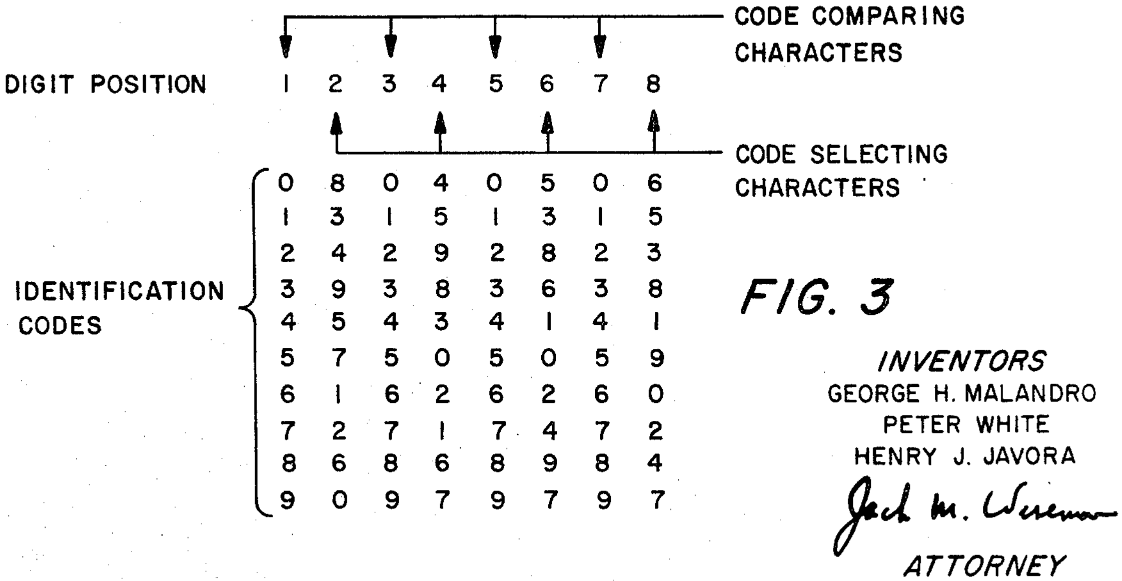
FIG. 3 is a graphic illustration of additional examples of identification codes comprising code selecting characters and code comparing characters.

It is also to be understood that a similar decimal code selecting digit in the various digit positions (FIGS. 1 and 3) will not necessarily select in each digit position the same decimal digit. However, the same decimal code selecting digit for a given digit position will select on each occasion the same decimal digit for comparison with the code comparing digit of the particular digit position.

All the digits at a given digit position of an identification code and all the digits at another given digit position of the identification code associated therewith form a set representing a code selecting digit and a code comparing digit that have the output thereof routed to a comparator circuit. In the exemplary embodiment, signals emitted from the keyboard 15 representative of the code digits 0–9 at code comparing digit position 1 are routed to a comparator circuit 20. Signals emitted from the keyboard 15 representative of the digits 0–9 at code selecting digit position 2 are routed to the comparator circuit 20. Position 1 digit is the associated code comparing digit for the code selecting digit at position 2. Similarly, the signals emitted from the keyboard 15 representative of the code digits 0–9 at the code comparing digit position 3 are routed to a comparator circuit 25. The signals emitted from the keyboard 15 representative of the code digits 0–9 at the code selecting digit position 4 are routed to the comparator circuit 25. As previously described, the position 4 digit is the associated code selecting digit for the code comparing digit at position 3.

Likewise, signals emitted from the keyboard 15 representative of the code digits 0–9 at code comparing digit position 5 are routed to a comparator circuit 30. Signals emitted from the keyboard 15 representative of the code digits 0–9 at code selecting digit position 6 are routed to the comparator circuit 30. As previously described, the position 6 digit is the associated code selecting digit for the code comparing digit at position 5. In a similar manner, a comparator circuit 35 has routed thereto signals emitted from the keyboard 15 representative of the code 0–9 at the code comparing digit position 7 and also has routed thereto signals from the keyboard 15 representative of the code digits 0–9 at the code selecting digit position 8.

Connected to the comparator circuits 20–35 is a conventional four position ring counter circuit 40 which applies sequentially to the comparator circuits 20–35 an enabling voltage. At the commencement of each validation operation, the ring counter circuit 40 enables the comparator circuit 20 to accept and register the signal representing the keyed digit of digit position 1 for the code comparing digit. Thereupon, the comparator circuit 20 receives the signal representing the code selecting digit of the digit position 2. The comparator circuit 20 selects a predetermined code therein in response to having the signal representing the code selecting digit at digit position 2 routed thereto. A comparison is made by the comparator circuit 20 for a match or mismatch condition between the signal of the comparison code digit registered therein and the signal of the selected code. If the comparator circuit 20 generates a match condition in its output, the ring counter circuit 40 is advanced for transmitting an enabling voltage to the comparator circuit 25. It is to be observed that the operator operates the keyboard 15 to sequentially activate the code digits in the order arranged in the identification code.

When the comparator circuit 25 receives an enabling voltage, it accepts the signal representing the code of the keyed digit of the digit keyboard position 3 for the code comparing digit and registers therein the comparison code signal. Then, the comparator circuit 25 receives the signal representing the code selecting digit. The comparator circuit selects a predetermined code therein in response to receiving a signal representing the code selecting digit at digit position 4. A comparison is made by the comparator circuit 25 for a match or mismatch condition between the signal of the code comparing digit registered therein and the signal representing the predetermined code selected by the code selecting digit. Should the comparator circuit 25 generate a match condition in its output, the ring counter circuit 40 is advanced for transmitting an enabling signal to the comparator circuit 30.

The foregoing procedure is repeated for the comparator circuit 30 with respect to the code signal of the activated key representing the code digit at the code comparison digit position 5 and the predetermined code signal selected by the activated key representing the code digit at the code selecting position 6. Likewise, the foregoing procedure is repeated for the comparator circuit 35 with respect to the code signal registered by the activated key representing the code digit at the code comparison digit position 7 and the preselected code signal selected by the activated key representing the code digit at the code selecting digit position 8. The ring counter circuit 40, therefore, sequentially applies enabling signals to sequentially operate the comparator circuits 20–35. Should the comparator circuit 35 signal a matched condition to the ring counter circuit 40, the ring counter circuit 40 will operate a valid signal device or operate a control device to perform a predetermined function. At this time, the ring counter circuit 40 will reset the comparator circuits 20–35.

On the other hand, should any one of the comparator circuits 20–35 in their sequential operation generate a mismatch condition, then the ring counter 40 will operate a reject signally device and reset the comparator circuits 20–35 for the beginning of a new cycle.

All of the comparator circuits 20–35 operate in a similar manner and include similar elements. Hence, only the comparator circuit 20 will be described in detail. The comparator circuit 20 comprises a conventional 10 bit register 50, which registers the code comparing signal transmitted from the keyboard 15 and representing the code comparison digit at identification code position 1. In addition, the comparator circuit 20 comprises a code selecting matrix 55, which receives from the keyboard 15 by the activation of a key thereof a signal representing the code selecting digit at identification code digit position 2 and selects a predetermined code in the matrix 55. Lastly, the comparator circuit 20 comprises a gate logic circuit 60 which compares the code signal transmitted from the matrix 55 representing the code selected by the code selecting digit at digit position 2 with the signal registered in the 10 bit register 50, which represent the comparison digit at identification code digit position 1. The gate logic 60 also transmits from the comparison made a match or mismatch condition.

Initially, the output of the ring counter 40 transmits an enabling signal over a conductor 61, which causes and AND gate 62 to conduct. The AND gate 62, in turn, causes an AND gate 63 to conduct. The output of the conducting AND gate 63 transmits an enabling signal over a conductor 64 to enable the ten bit register 50 to receive an incoming signal from an actuated key of the keyboard 15 representing the digit position 1.

An operator whose identification code is to be verified enters the identification code in the keyboard 15 sequentially in the order shown in the identification code. The first position digit signal from the keyboard 15 registers in the 10 bit register 50. The second position digit signal from the keyboard 15 is received by the matrix 55 and selects a predetermined code from the internal wire network thereof.

Connected to the output of the matrix 55 and the ten bit register 50 are AND gates 70–79 of the logic circuit 60. Assuming that the identification code to be verified is the identified code shown in FIG. 2, the second digit position keyed into the keyboard 15 transmits a signal corresponding to the digit 5 over a conductor 81, which transmits a signal from an output terminal 4 over a conductor 84 to the AND gate 75. The code signal corresponding to the digit 4 is received by the 10 bit register 50 over a conductor 82, which registers the signal and transmits a signal from the output terminal 4 over a conductor 83 to the AND gate 75. Since the digits entered in the identification code positions 1 and 2 in the keyboard 15 are correct, the AND gate 75 conducts. If the digits entered in positions 1 and 2 were incorrect, then none of the AND gates 70–79 would conduct.

Connected to the outputs of the AND gates 70–79 is an OR gate 85. If anyone of the AND gates 70–79, such as the AND gate 72, conducts, then the OR gate 85 will conduct. If none of the AND gates 70–79 conduct, then the OR gate 85 will remain non-conducting. Thus, a matched condition between the digits of the first and second positions of the identification code turns "on" the OR gate 85 and an unmatched condition between the digits of the first and second positions of the identification code results in an "off" state for the OR gate 85.

The output of the OR gate 85, when gated through an AND gate 86 by an AND gate 87 conducting, will produce a match signal for transmission to the ring counter 40 over a conductor 90. When the OR gate 85 is "off," a signal is transmitted through an inverter circuit 91 to turn on an AND gate circuit 93, when the AND gate 87 is conducting, to produce a fail or mismatch signal over a conductor 95 for transmission to the ring counter circuit 40.

Whenever a key of the keyboard 15 is activated, an OR gate 96 is turned on. The output of the OR gate 96, when the OR gate 96 is conducting, causes the AND gate 62 to conduct, which signifies the coincidence of the DATA signal produced by the OR gate 96 and selection of the comparator circuit 20 by the ring counter 40. The sequencing within each comparator circuit is controlled by a flip-flop circuit 97, which changes its state whenever a DATA signal occurs by virtue of the connection of its complement input to the DATA signal line, so as to be in the "0" state for digit selecting signals and the "1" state for digit comparing signals.

Thus, the output of the AND gate 63 signifies coincidence for the DATA signal, selection of the comparator circuit 20, and the presence of a code comparing digit signal in the 10 bit register circuit 50. The output of the AND gate 87 signifies coincidence for the DATA signal, selection of the comparator circuit 20, and the presence of the selected code by the code selecting digit signal received by the matrix 55. The inverter 91 provides a corresponding test signal for the AND gate 93 to test for a FAIL condition.

Figures 4, 5:
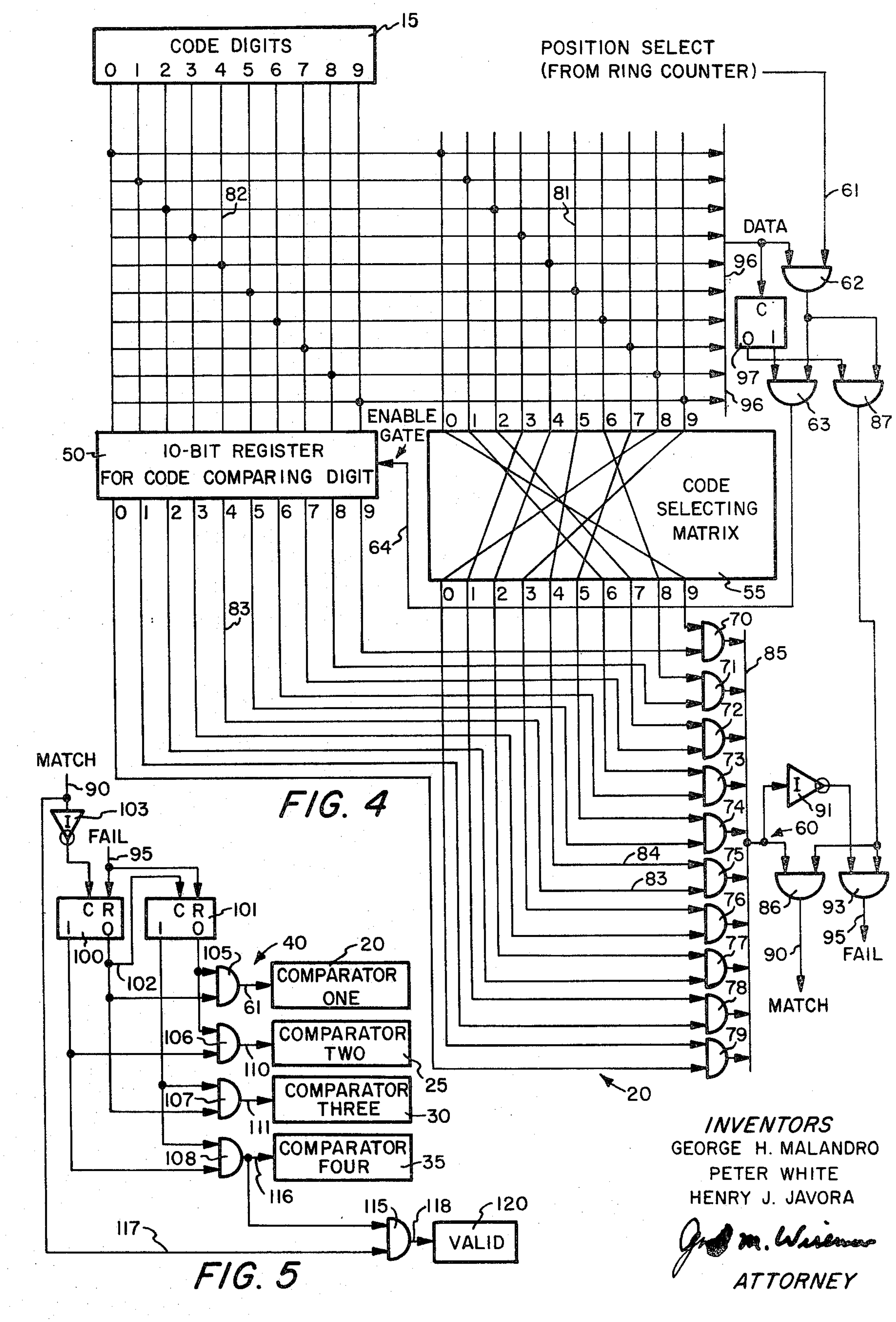
FIG. 4 is a schematic diagram of a comparator circuit employed in the apparatus of the present invention.
FIG. 5 is a schematic diagram of a ring counter circuit employed in the apparatus of the present invention.

Illustrated in FIG. 5 is the ring counter circuit 40 which comprises conventional flip-flop circuits 100 and 101 interconnected over a conductor 102. An inverter circuit 103 is connected to the input side of the flip-flop circuit 100. The conductor 102 interconnects the reset output of the flip-flop circuit 100 with the input of the flip-flop circuit 101. AND gates 105–108 are connected to the output of the flip-flop circuits 100 and 101.

At the beginning of each identification code cycle, the flip-flop circuits 100 and 101 are at zero state. When the match condition signal is transmitted from the comparator circuit 20 over the conductor 90, the flip-flop circuit 100 is set to a "1" state at the termination of the signal. Since the flip-flop circuit 101 is at a zero state and the flip-flop circuit 100 is now in a "1" state, the AND gate 106 conducts to transmit an enabling signal to the comparator circuit 25 over a conductor 110.

When the comparator circuit 25 transmits a match condition signal over the conductor 90, the flip-flop circuit 100 is reset to a zero state at the termination of the signal and the flip-flop circuit 101 is set to a condition "1" state. Thus, the AND gate 107 conducts to transmit an enabling voltage over a conductor 111 to the comparator circuit 30. Should the comparator circuit 30 transmit a match condition signal over the conductor 90, the flip-flop circuit 100 is set to a "1" state at the termination of that signal and the flip-flop circuit 101 remains at a "1" state. Thus, the AND gate 108 conducts.

When the AND gate 108 conducts, one side of a control AND gate 115 is prepared for rendering the gate 115 conductive and also an enabling voltage is transmitted over a conductor 116 to the comparator circuit 35. If the comparator circuit 35 transmits a match condition signal over the conductor 90, the flip-flop circuits 100 and 101 are reset to the zero conditions of their initial state at the termination of the signal signifying a MATCH condition. In addition thereto, a signal is transmitted over a conductor 117 to cause the AND gate 115 to conduct. Thereupon, a verification signal is transmitted over a conductor 118 to operator a verification signalling device, a control mechanism, or a control circuit 120.

Should a mismatch or final signal be transmitted over the conductor 95 from any of the comparator circuits 20–35, both flip-flop circuits 100 and 101 are reset to zero state.

We claim:

1. A method of verification of an identification code comprising the steps of:

a. producing signals representing a plurality of characters of an identification code;

b. comparing a signal representing one of said characters with a signal selectively representative of another of said characters;

c. deriving from a prearranged code selecting matrix said signal selectively representative of said other character in response to said matrix receiving said signal of said other character; and d. producing a control signal in response to the comparison between the signal representing said one character and the signal selectively representative of said other character.

2. A method as claimed in claim 1 wherein said one character is a code comparing digit, and said other character is a code selecting digit associated with said code comparing digit.

3. A method as claimed in claim 2 wherein each of said code selecting characters has a predetermined digit position within the identification code.

4. A method as claimed in claim 3 wherein each of said code comparing characters has a predetermined digit position within the identification code.

5. A method of verification of an identification code which includes a plurality of code selecting characters and a plurality of code comparing characters, said code comparing characters being respectively associated with said code selecting characters, said method comprising the steps of:

a. producing a plurality of code signals selectively representative of said code selecting characters respectively;

b. producing a plurality of signals representing said code comparison characters respectively;

c. deriving from a code selecting matrix said code signals selectively representative of said code selecting characters in response to said matrix receiving signals representing said code selecting characters;

d. comparing respectively said signals representing said code comparison characters with said code signals selectively representative of the associated code selecting characters; and e. producing a control signal in response to the comparison between said signals representing said code comparison characters and said code signals selectively representative of said code selecting characters.

6. A method as claimed in claim 5 wherein each of said code selecting characters has a predetermined digit position within the identification code.

7. A method as claimed in claim 6 wherein each of said code comparing digits is associated with one of said code selecting digits has a predetermined digit position within the identification code.

8. A method as claimed in claim 7 wherein each of said characters in said identification code is selected respectively from decimal digits in the range from 0 to 9.

9. Apparatus for the verification of an identification code comprising:

a. means activated to produce a plurality of signals respectively representing a plurality of code selecting characters of an identification code and a plurality of signals respectively representing a plurality of code comparing characters of the identification code; said signals representing said plurality of code comparing characters being associated respectively with said signals representing said plurality of code selecting characters, b. a comparator circuit for each of said code selecting characters, each of said comparator circuits being connected to said means to receive the signals representative of its associated code selecting character and to receive the signal representative of the code comparing character associated with its associated code selecting character; each of said comparator circuits being arranged to translate its associated signal selected by its associated code selecting character, each of said comparator circuits being arranged to compare its associated translated signal selected by its associated code selecting character with the signal representative of the code comparing character associated with its code selecting character for transmitting a verification signal; and c. circuit means connected to said comparator circuits and responsive to the verification signals produced by said comparator circuits for producing a verification control signal.

10. Apparatus as claimed in claim 9 in which each of said code selecting characters is a code selecting digit and each of said code comparing characters is a code comparing digit, each of said code selecting digits having a preselected digit position, and each of said code comparing digits having a preselected digit position.

11. Apparatus as claimed in claim 10 in which each of said code selecting digits being of a range between 0–9, and in which each of said code comparing digits being of a range between 0–9.

12. Apparatus as claimed in claim 9 in which said circuit means is a ring counter circuit for sequentially operating said comparator circuits.

13. Apparatus as claimed in claim 12 in which said ring counter circuit produces an enabling signal for one of said comparator circuits in response to a verification signal from a preceding comparator circuit in the sequential operation of the comparator circuits.

14. Apparatus as claimed in claim 13 in which said ring counter circuit produces a verification signal in response to said comparator circuits producing matched verification signals.

15. Apparatus as claimed in claim 12 in which said ring counter circuit recycles said comparator circuits in response to anyone of said comparator circuits producing mismatched signal.

16. Apparatus as claimed in claim 9 in which each of said comparator circuits includes circuit means for registering its associated signal representative of the code comparing character.

17. Apparatus as claimed in claim 9 in which each of said comparator circuits includes a circuit for selecting associated translated code signal in response to a signal representing a code selecting character.

* * * * *